United States Patent [19]
Watanabe

[11] Patent Number: 5,598,395
[45] Date of Patent: Jan. 28, 1997

[54] DATA LOSS PREVENTION IN A CACHE MEMORY WHEN THE TEMPERATURE OF AN OPTICAL RECORDING MEDIUM IS ABNORMAL

[75] Inventor: Yoshimi Watanabe, Tokyo, Japan

[73] Assignee: Olympus Optical Co., Ltd., Tokyo, Japan

[21] Appl. No.: 330,859

[22] Filed: Oct. 28, 1994

[30] Foreign Application Priority Data

Nov. 2, 1993 [JP] Japan .................................... 5-274404

[51] Int. Cl.[6] .............................. G11B 20/10; G11B 7/00
[52] U.S. Cl. ................................ 369/116; 369/54; 369/58
[58] Field of Search .............................. 369/116, 13, 54, 369/58; 360/59, 77.03, 77.04, 77.08, 114; 395/425, 575; 365/228

[56] References Cited

U.S. PATENT DOCUMENTS 5,084,791  1/1992  Thanos et al. .................... 360/77.04
5,249,172  9/1993  Hagihara et al. ...................... 369/116
5,297,128  3/1994  Yamaguchi et al. .................. 369/116
5,313,612  5/1994  Satoh et al. .......................... 395/425
5,343,459  8/1994  Roesinger et al. .................... 369/116

FOREIGN PATENT DOCUMENTS

60-245029  12/1985  Japan .
4-205823   7/1992  Japan .

*Primary Examiner*—Georgia Y. Epps
*Assistant Examiner*—Kim-Kwok Chu
*Attorney, Agent, or Firm*—Armstrong, Westerman, Hattori, McLeland & Naughton

[57] ABSTRACT

A MPU forbids using of a write cache memory when a temperature detected with a temperature sensor is greater than a value set at a value lower than a value of a temperature becoming an abnormal temperature, or prevents lost data in a write cache memory beforehand by reporting an error to a host computer after writing all of data to be stored in the write cache memory but not to be recorded, on an optical recording medium.

18 Claims, 5 Drawing Sheets

DATA LOSS PREVENTION IN A CACHE MEMORY WHEN THE TEMPERATURE OF AN OPTICAL RECORDING MEDIUM IS ABNORMAL

BACKGROUND OF THE INVENTION

1. Field of the Invention

The present invention relates to an information recording apparatus for detecting a temperature and controlling a data write operation, to record write data from a host computer to an optical recording medium using a write cache memory (temporary memory), and to a method for controlling write in the information recording apparatus.

2. Description of the Related Art

Heretofore, a magneto-optical disk apparatus heats a recording layer of a magneto-optical disk with laser light, eliminates magnetizing, and performs a write operation while applying an external magnetic field. This type of magneto-optical disk apparatus detects indirectly a temperature of a disk surface radiated with laser light, monitors its temperature, and performs a write operation with an adequate write power for every constant temperature range. Therefore, if the magneto-optical disk apparatus detects an abnormal temperature, it determines not to correctly write data in case of a continuing write operation, warns a user of abnormality, and forbids a write operation.

In addition, some recording apparatuses such as disk drives whose access time is relatively long try to make access high-speed through moving frequently referred data to a high-speed memory called a cache memory or a memory management unit.

In case that a magneto-optical disk apparatus uses the cache memory, in regard to data acquisition in a write operation, when the apparatus acquires data from a host computer to the cache memory, it reports normal completion of a write operation to the host computer, and then, it writes data in the cache memory to a recording medium.

In the above-mentioned prior art, there is a method for using a write cache memory, and reporting an error in data write or continuing data write at an abnormal temperature in case that plenty of data are in the cache memory and an abnormal temperature is detected.

In the former method, when an abnormal temperature is reported from a magneto-optical disk apparatus to a host side, it is common that the magneto-optical disk apparatus is usually turned off, and it is operated again after some time passes. Consequently, data after detecting an abnormal temperature are not written to a recording media, and become lost data.

Further, in the latter method, if the apparatus continues to write data on the recording medium in the state of an abnormal temperature, alternative sector number increases, there is a possibility of an inability to perform a write operation, and hence, it is not preferable.

For example, the case where the apparatus continues to write in the state of detection of an abnormal temperature with holding 20 blocks of 200 kBytes of data in the four MBytes of a cache memory will be considered. Assuming that the write speed of a drive is 200 kB/sec and average access time is 40 msec, 40 msec×20+200 kB/200 kB/sec×20=nearly 21 sec.

Thus, a write operation should be done for 21 sec under an abnormal temperature, the possibility of an occurrence of alternate processing is high during this time, a write time becomes long, and further, there is a possibility of an inability to perform a write operation.

SUMMARY OF THE INVENTION

An object of the present invention is to provide an information recording apparatus for detecting a temperature and controlling a data write operation, to be capable of preventing beforehand lost data in a cache memory due to occurrence of an abnormal temperature, and securely performing a normal write operation of data including data in the cache memory to an optical recording medium.

Another object of the present invention is to provide an information recording apparatus for detecting a temperature and controlling data write, to be capable of securely performing normal write of data in the cache memory to an optical recording medium at an abnormal temperature or a temperature having high possibility of the abnormal temperature, and also making a host computer recognize its abnormality.

A further object of the present invention is to provide a method for controlling data write in an information recording apparatus to be capable of preventing beforehand lost data in a cache memory due to occurrence of an abnormal temperature, and securely performing a normal write operation of data including data in the cache memory to an optical recording medium.

A still furthermore object of the present invention is to provide a method for controlling write in an information recording apparatus to be capable of securely performing a normal write operation of data in the cache memory to an optical recording medium at an abnormal temperature or a temperature having high possibility of the abnormal temperature, and making a host computer recognize its abnormality.

According to a preferred embodiment of the present invention, an information recording apparatus for detecting a temperature and controlling a data write operation comprises: a driving means for driving a light source radiating laser light to an optical recording medium with a predetermined power at least for data recording; a detecting means for detecting a temperature around the laser light; a temporary memory means for temporarily storing data to be transferred from an upper control means and to be recorded on the optical recording medium; and a control means for controlling at least one processing operation between processing for controlling power of the laser light through the driving means so as to become a predetermined power, for determining whether a temperature detected by the detecting means is greater than a regular value set at a value of at most abnormal temperature, and for writing all of the data to be recorded but not to be recorded yet on the optical recording medium and to be stored now in the temporary memory means, on the optical recording medium, after forbidding using of the temporary memory means if the detected temperature is greater than the regular value, or another processing for reporting an error to the upper control means after writing all of the data to be recorded but not to be recorded yet on the optical recording medium and to be stored now in the temporary memory means, on the optical recording medium.

According to another embodiment of the present invention, a method for controlling a write operation in an information recording apparatus comprises the steps of: detecting a temperature around laser light at least for data recording; confirming whether an apparatus has received from an upper control means a command to write data to be written on an optical recording medium; determining whether a temporary memory means for temporarily storing the data to be written is usable if reception of the command is confirmed at the confirming step; temperature-determining whether a temperature detected at the detecting step is over a regular value set at a value of at most abnormal temperature if the temporary memory means is usable in the determining step; and writing all of the data to be recorded but not to be recorded yet on the optical recording medium and to be stored now in the temporary memory means, on the optical recording medium after forbidding using of the temporary memory means if the detected temperature is greater than the regular value at the temperature determining step.

The other features and advantages of the present invention will become clear enough from the following detailed description.

BRIEF DESCRIPTION OF THE DRAWINGS

FIG. 1 to FIG. 3 relate to the first embodiment.

DETAILED DESCRIPTION OF THE PREFERRED EMBODIMENTS

Embodiments of the present invention will be described subsequently, referring to accompanying drawings.

Figure 1:
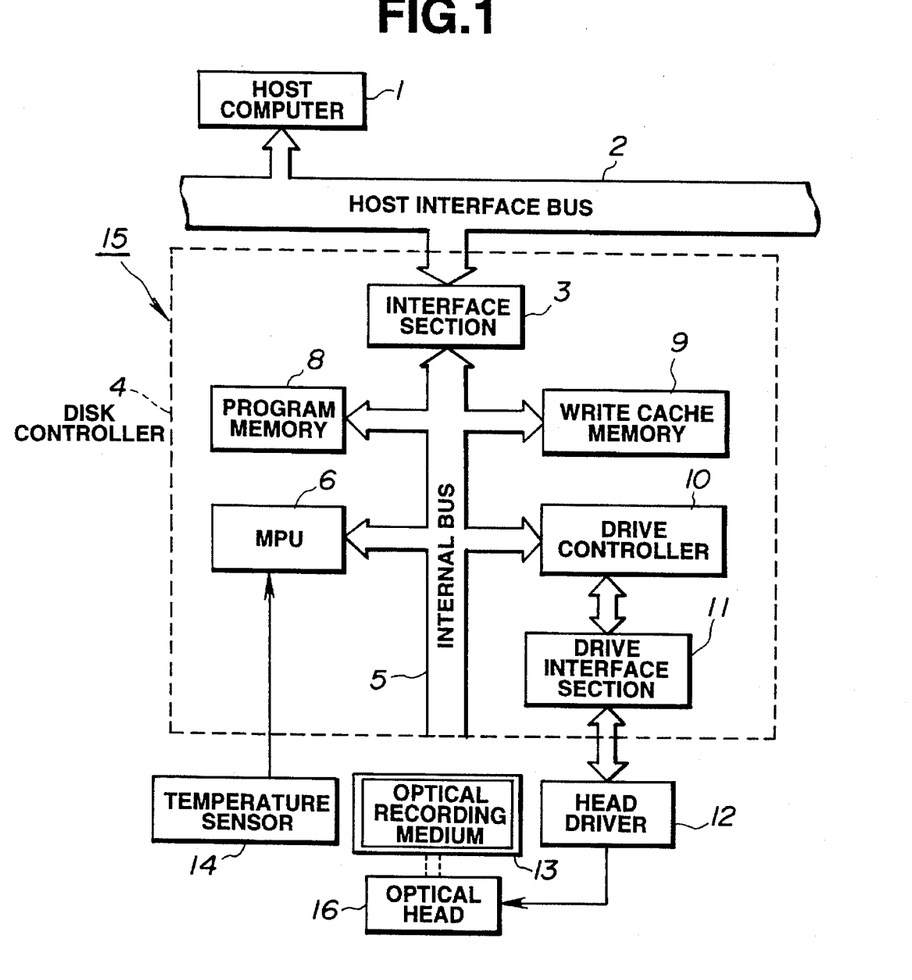
FIG. 1 is a block diagram showing an optical disk apparatus to which this embodiment is applied.
Figure 2:
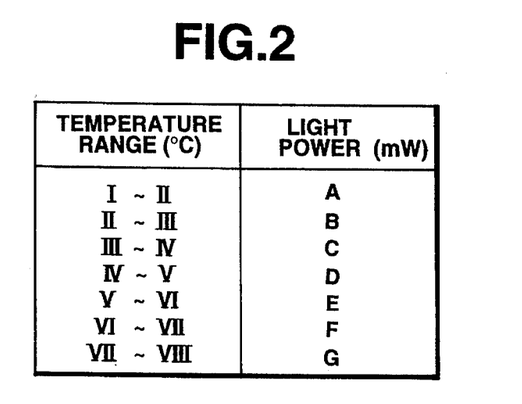
FIG. 2 is a power-table showing temperature range to light power.
Figure 3:
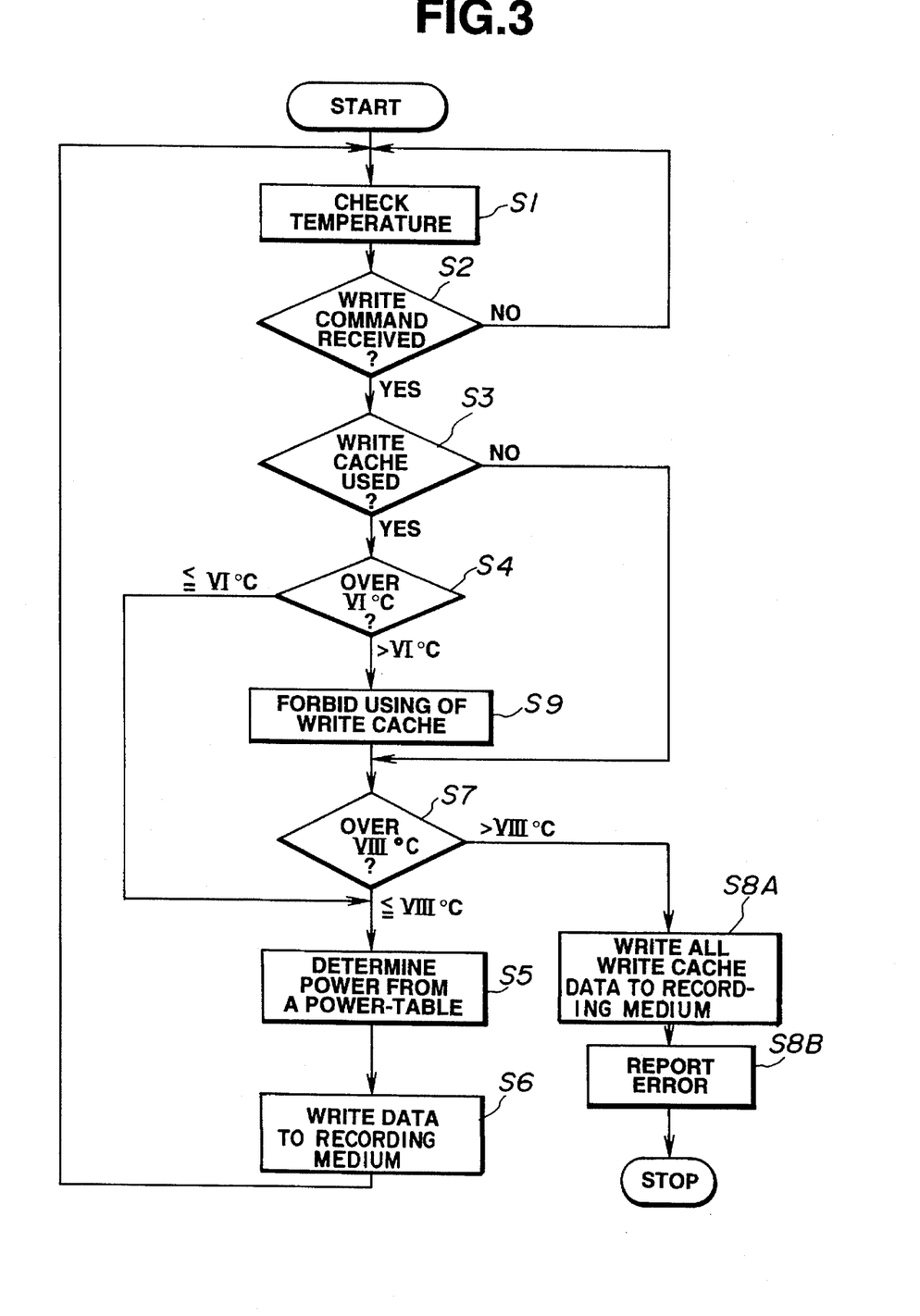
FIG. 3 is a flowchart relating to disk cache control in a write operation.

FIG. 1 to FIG. 3 relate to the first embodiment, and FIG. 1 is an optical disk apparatus to which this embodiment is applied, FIG. 2 is a power-table showing temperature range to light power, and FIG. 3 is a flowchart relating to disk cache control in a write operation.

An optical disk apparatus 15 shown in FIG. 1 as an information recording apparatus is configured to forbid use of a cache memory in a write operation in a temperature range that is one step below an abnormal temperature, and forbidding use of a cache memory. In addition, as the optical disk apparatus 15, both a write-once optical disk apparatus and a writable optical disk apparatus are applicable, and a configuration capable of play-back besides recording is possible.

The optical disk apparatus 15 has a disk controller 4 connected through a host interface bus 2 and an interface (I/F), section 3 to a host computer 1, that is, an upper control means. The disk controller 4 is connected through an internal bus 5, which the interface section 3 is connected to, to an MPU (Micro Processing Unit) 6 composing a control means, a program memory 8 composing a control means, a temporary memory (hereafter: write cache memory) 9, called a cache as a temporary memory means, and a drive controller 10 composing a control means. This disk controller 4 performs an input/output of data with the host computer 1 and various management.

The MPU 6 performs an input/output of control data with the host computer 1 through the interface section 3, and manages a program memory 8, a write cache memory 9, a drive controller 10, etc. The program memory 8 stores programs necessary to this apparatus 15, among which a program relating to disk cache control mentioned later is included. The write cache memory 9 temporarily stores data to be transmitted from the host computer 1 and to be written on an optical recording medium and other necessary data.

The drive controller 10 controls, through a drive interface section 11, driving of a head driver 12 that is a driving means for driving a light source of an optical head 16 radiating laser light to the optical recording medium and controlling its power.

For example, information that is obtained from modulation of write data with the laser light radiated from the light source is written on the optical recording medium 13. In addition, the optical head 16 can also read data written on the optical recording medium 13.

Whenever the optical recording medium 13 is, for example, a magneto-optical disk, the head driver 12 has a configuration also including a magnetic field generation means. Further, as the optical recording medium, a card-shaped medium can be used besides a disk-shaped medium, and in this case, the information recording apparatus becomes an optical card recording apparatus capable of recording at least data on a card.

A temperature sensor 14 is disposed near the optical recording medium 13 or the optical head 16, and detects a temperature near laser light radiated from the optical head 16. This temperature sensor 14 supplies the detected temperature to the MPU 6, and the MPU monitors a level of the temperature.

Operation of this embodiment will be described subsequently, referring to the flowchart in FIG. 3 and the temperature-power table in FIG. 2.

In the above-mentioned configuration, the MPU 6 checks a temperature using the temperature sensor 14 every constant time as shown at the step S1 in FIG. 3, and monitors whether it has received a write command to a recording medium from the host computer 1 as shown at the step S2. If it has not received the command, it goes to a waiting state, and continues temperature check and confirmation of command reception at the steps S1 and S2.

In case that it has received the write command to the recording medium from the host computer 1, the MPU 6 of the dish controller 4 determines at the step S3 whether the write cache memory 9 is used, and acquires data to be written to the write cache memory 9, through the interface section 3 from the host computer 1 if using of the write cache memory is permitted from the state of a usage rate of the write cache memory 9. After completion of write data acquisition, the MPU 6 of the disk controller 4 reports completion of normal acquisition to the host computer 1.

Here, rolls of the MPU 6 will be mentioned. In acquisition of the write data, the MPU 6 determines a usage rate of the write cache memory 9 and an access state from the host computer 1 such as transferred data volume. In addition, according to the determination result, the MPU 6 continues to acquire data into the write cache memory 9 or makes the host computer 1 wait to correspond.

The MPU 6 is composed so as to determine whether it will use this write cache memory 9, through determining, for example, a usage rate of the write cache memory 9. Taking the simplest configuration as an example, the MPU 6 determines to use the write cache memory 9 when the usage rate of the write cache memory 9 is sufficiently low, and determines not to use when the usage rate is very high. Further, the MPU 6 can recognize whether the write cache memory 9 is used, by means of checking whether the usage rate is equal to or more than zero as processing at the step S3.

The step to write contents of the write cache memory 9 to the optical recording medium 13, is performed as described below, and the MPU 6 controls and drives the optical head 16 through the head driver 12 in write.

The MPU 6 checks a temperature every constant time using the temperature sensor 14, and determines whether the temperature checked at the step S4 is over a regular value, e.g., VI° C. shown in FIG. 3.

If the temperature is equal to or less than a regular value at the step 4, the disk controller 4 sets a light power at the step S5 on the basis of the temperature-power table in FIG. 2, and writes data on the optical recording medium 13 at the step S6. In addition, a light power is set at the adequate value, C mW if the current temperature is within III°—IV° C.

The step S6 is connected to the step S1, and composes a loop. Within this loop, the temperature check, GO/NO GO of the cache memory usage, power setting, and write are determined by the MPU 6, and those operations are repeated.

Here it is assumed that the temperature-power table in FIG. 2 is stored beforehand in the program memory 8 composed of, for example, a ROM. However, it is possible to access control tracks of the optical recording medium 13, to read the power-table corresponding to the type of each medium from the control tracks of the optical recording medium, and to store another memory (not shown).

In the temperature-power table in FIG. 2, seven temperature ranges are set, and an adequate value of the light power of the light source is set per temperature range. For example, at the first (minimum) range I°–II° C., the light power is A mW, and at the range VI°–VII° C. that is one range below the last (maximum) range, the light power is F mW. In addition, at the maximum range VII°–VIII° C., the light power is G mW, and, if a temperature is over the VIII° C., it is the abnormal temperature.

The regular value of a temperature becoming a criteria at the step S4 is set at VI° C. shown on the table in FIG. 2, and the MPU 6 determines whether a temperature is over VI° C.

On the other hand, at the step S3, in case that the write cache memory is not used in a write operation, the MPU 6 confirms whether a temperature is over VIII° C., that is, the maximum value at the step S7. At this time, if the temperature is equal to or less than VIII° C., e.g., within VII°–VIII° C., the MPU 6 sets the light power at G mW on the basis of the power-table at the step 5, and subsequently performs write processing at the step S6.

Further, at the step S7, if the temperature is over VIII° C., the MPU 6 sets the light power at G mW at the step S8A, and, after the MPU 6 writes all data in the write cache memory to the optical recording medium 13, it reports the error of the abnormal temperature to the host computer 1 at the step S8B.

Meanwhile, in the above-mentioned loop, in case that the write cache memory 9 is used in a write mode at the step S3, and the temperature is within V°–VI° C., the MPU sets the light power at E mW at the step S5 through the step S4, and performs write processing at the step S6. If the temperature increases due to write or poor heat radiation in continuing write processing, and arrives at within VI°–VII° C. that is one range before to the upper limitation range (VII°–VIII° C.), the MPU 6 forbids use of the write cache memory 9, sets the light power at the adequate value on the basis of the power-table at the steps S5 and S6, and writes all data in the write cache memory 9 on the optical recording medium 13. During this period, a command to wait is made by a new write command, and it is executed through writing data transferred from the host computer 1 directly on the optical recording medium 13 without using the write cache memory 9 after completion of the former write operation. In addition, since the MPU 6 at step S6 has already recognized YES/NO or GO/NO GO of usage of the write cache memory 9 at the steps S3 and S9, according to the recognition, the MPU has already selected the source of write data between the write cache memory 9 and the host computer 1.

After that, the temperature further increases, and even if the temperature is over VIII° C. in check at the step S7, a write operation to the write cache memory 9 has been already forbidden, hence, the processing moves to the step S8B without lost data, and the MPU can report the error of the abnormal temperature to the host computer 1.

In this embodiment, in the state of using the write cache memory 9, when the temperature detected with the temperature sensor 14 is greater than the regular value set at the value lower than an abnormal temperature, the MPU forbids using of the write cache memory 9, writes all of the data to be recorded but not to be recorded yet on the optical recording medium and to be stored now in the temporary memory means, on the optical recording medium. Therefore, the MPU can prevent data loss even if data are left in the write cache memory 9, and forbids use of the write cache memory 9 after the write operation.

Here the regular value VI° C. is the lowest value of the range VI–VII that is one range less than the maximum range. Thus, in this embodiment, before an abnormality occurs and before the probability of abnormality occurrence becomes high, that is, before it arrives to the maximum range VII–VIII in an example of the table shown in FIG. 2, the MPU assures a normal write operation of data after that through forbidding using of the write cache memory 9. In other words, this embodiment forbids using of the write cache memory 9 before the highest stage of abnormality occurrence, and hence, plans to prevent occurrence of abnormality beforehand. Further, in the state of forbidding using of the write cache memory 9, in this embodiment, the host computer writes data directly to the optical recording medium.

Furthermore, in this embodiment, if the temperature is greater than the maximum value of the maximum range, the MPU reports the error as an abnormal temperature to the host computer 1, and can write again in the available state because of a temperature decrease.

Figure 4:
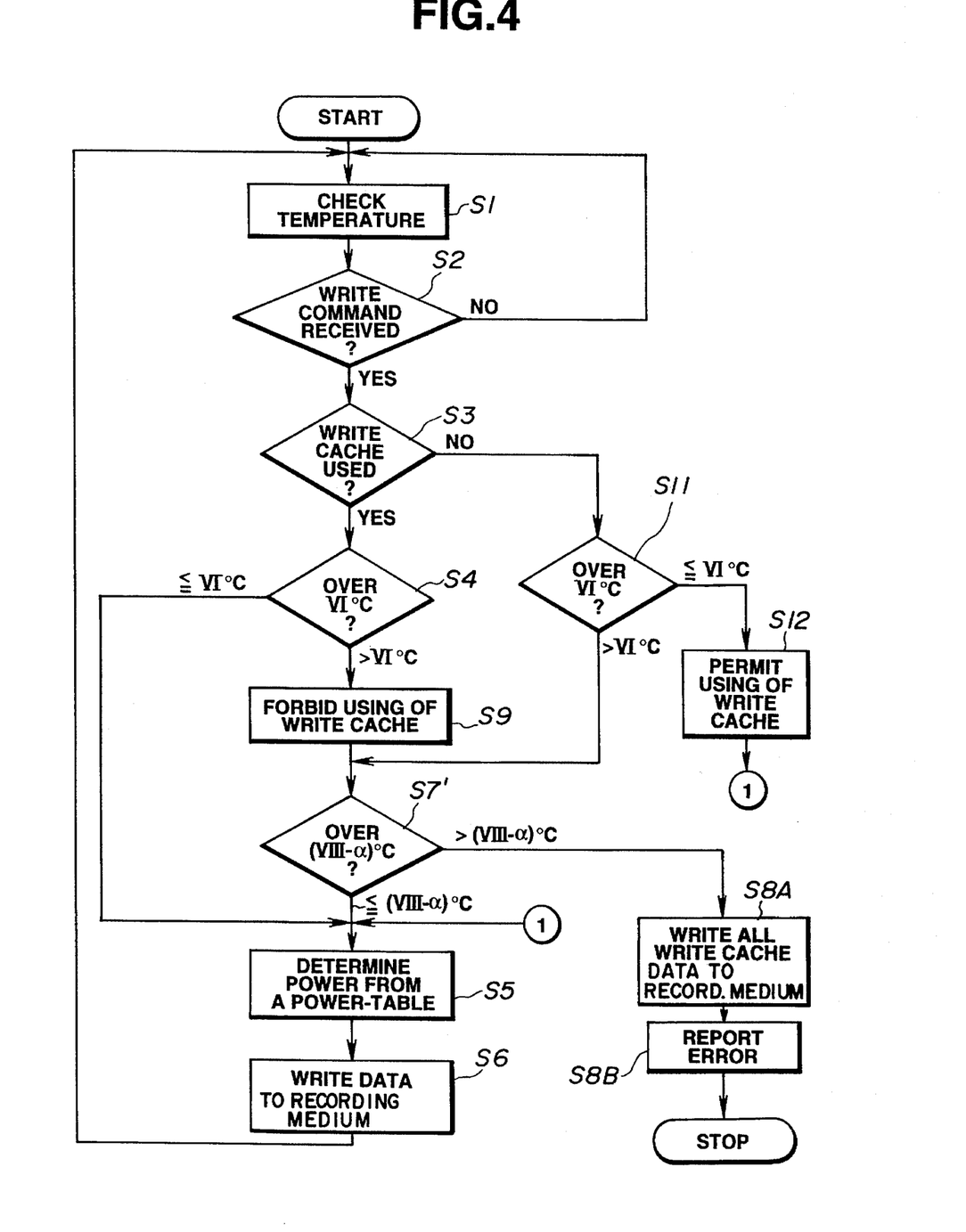
FIG. 4 is a flowchart relating to disk cache control in a write operation according to a modified example of the first embodiment.

FIG. 4 is a flowchart relating to disk cache control in a write operation according to the modified example of the first embodiment.

An optical disk apparatus of this modified example has the same configuration as that of the first embodiment, while the step relating to write cache control differs somewhat from that of the first embodiment.

In this modified example, it is assumed that the contents of the program stored in the program memory 8 are different, and that the power-table shown in FIG. 2 is used, similar to the first embodiment.

In the flowchart shown in FIG. 4, the steps S11 and S12 are added to the steps of the flowchart in FIG. 3 and to the route of no use at the step S3. In addition, the flowchart shown in FIG. 4 has the step S7' instead of the step S7 in the flowchart of FIG. 3.

Still more, descriptions of the other configuration and operation the same as those of the first embodiment are omitted with using same codes to the same parts.

Therefore, in the flowchart of FIG. 4, if the write cache memory 9 is not used yet at the step S3, the MPU determines whether the temperature is over VI° C. at the step S11, permits using of the write cache memory 9 at the step S12 if it is not greater than VI° C. and the situation permits, and controls a write operation using the write cache memory 9 at the step S6 through the step S5.

On the other hand, if the temperature is not greater than VI° C. at the step S11, the processing moves to the step S7'. At the step S7', the MPU determines whether the error should be reported on the basis of (VIII−α)° C. as the critical temperature that is confirmed at the step S7 and is reported as an abnormal temperature, considering further safety. The number, −α° C. can be optionally set.

Since the other configurations, operation, and advantages are same as those of the first embodiment, descriptions of them are omitted.

Figure 5:
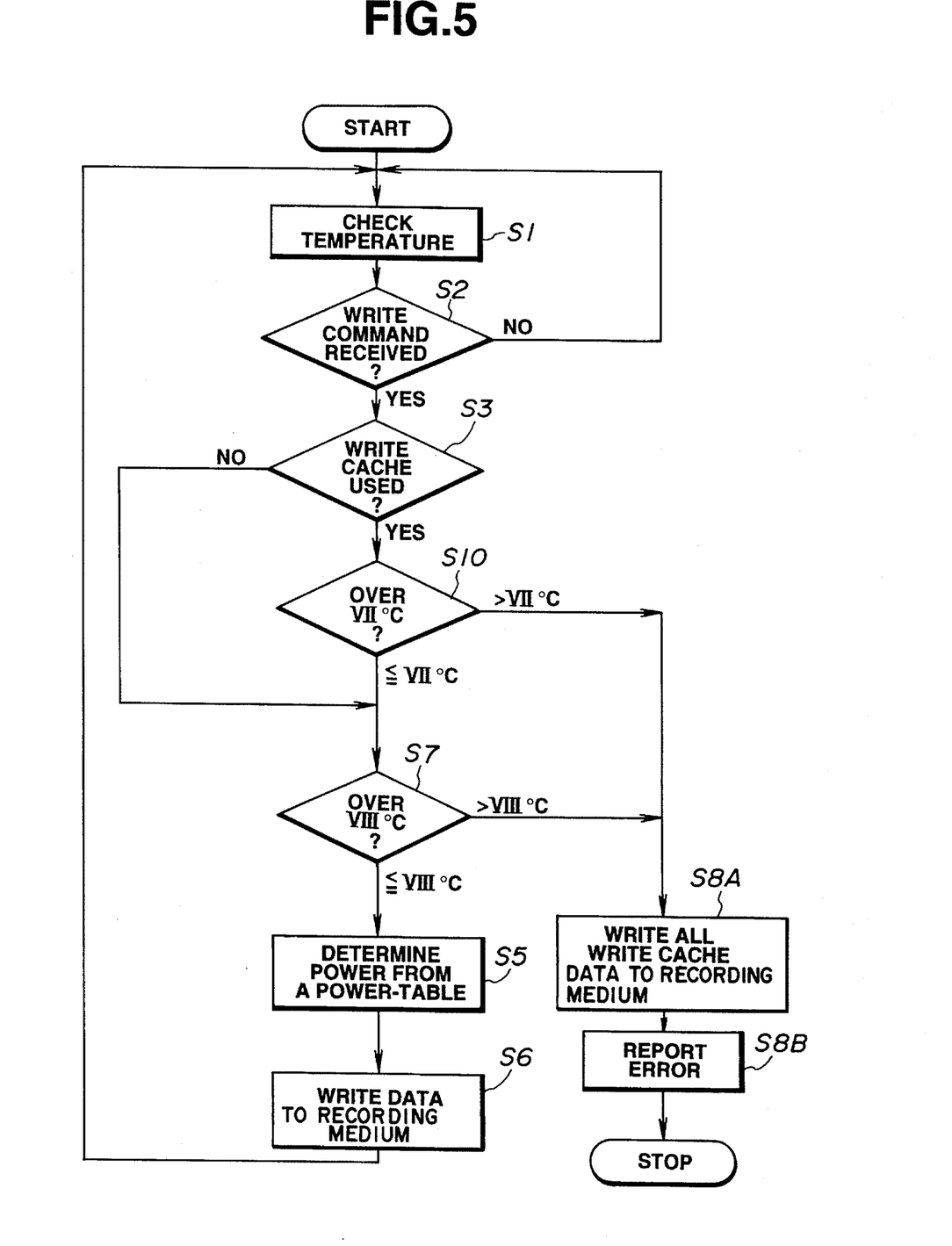
FIG. 5 is a flowchart relating to disk cache control in a write operation according to the second embodiment.

FIG. 5 is a flowchart relating to write cache control in a write mode according to the second embodiment.

An optical disk apparatus of this embodiment is similar to the first embodiment in regard to the configuration, while steps on disk cache control differ somewhat from those of the first embodiment. In this embodiment, it is assumed that contents of programs stored in the program memory 8 are different from those of the former embodiment. The power-table shown in FIG. 2 is used in this embodiment the same as in the first embodiment.

In the flowchart shown in FIG. 5, instead of the flowchart in FIG. 3, the steps S4 and S9 are removed, and the step S10 in FIG. 5 is added instead. Thus, in the flowchart of FIG. 5, the MPU immediately reports an error in case the write cache memory is used and a temperature is greater than VII° C.

Hence, the optical disk apparatus according to this embodiment has a configuration to report an error at the range that is one range before to the maximum range, in using of the write cache memory for a write operation to a recording medium.

Descriptions of the other configuration and operation which are the same as those of the first embodiment are omitted with using same codes to the same parts.

A disk controller 4 of this embodiment that has received a write command to a recording medium from the host computer 1 acquires data to the write cache memory 9, and reports normal completion to the host computer 1. The MPU 6 determines a usage ratio of the write cache memory 9 and an access state from the host computer 1, and consequently, the MPU continues to acquire data to the write cache memory 9 or writes the data, i.e., contents of the write cache memory 9 to the optical recording medium 13 while making the host computer 1 wait to correspond. The MPU 6 checks a temperature every constant time using the temperature sensor 14, sets a light power on the basis of the temperature-power table in FIG. 2 if the temperature is equal to or less than the regular value, and writes data on the optical recording medium 13. The above processing is within the loop of the steps S1, S2, S3, S10, S7, S5, and S6 shown in FIG. 5.

Here, the case where the write cache memory 9 is used and the case where it is not used have different steps upon the temperature confirmation. In case the write cache memory 9 is not used at the step S3, the processing moves to the step S7 as same as in the first embodiment. On the other hand, if the write cache memory 9 is used, the temperature detected by the temperature sensor 14 is compared at the steps S10 and S7 with the value set at each step.

For example, if the write cache memory is not used in a write operation and the temperature is within VII°–VIII° C., the MPU sets the light power at G mW on the basis of the power-table through the steps S7 and S5, and performs write processing at the step S6. At the step S7, if the temperature is over VIII° C., the MPU reports an error of an abnormal temperature to the host computer 1.

In addition, if the write cache memory 9 is used in a write operation and the temperature is within VI°–VII° C., the processing moves to the step S5 through the steps S10 and S7, the MPU sets the power at F mW, and it performs write processing. In case where the temperature is over VI°–VII° C. (the range that is one range before to the maximum range that the temperature becomes an abnormal temperature if the temperature is over the upper limitation value of the range) due to a write operation or poor heat radiation, i.e., if the temperature is greater than VII° C. at the step S10, the MPU 6 writes all of the data to be written and to be stored now in the temporary memory means, on the optical recording medium, and reports after that against a command from the host computer 1 the error that an abnormal temperature occurs.

In this embodiment, in the state of using the write cache memory, if the temperature detected with the temperature sensor 14 is greater than the regular value set at the value lower than the temperature becomes an abnormal temperature, e.g., VII° C. in FIG. 5, the MPU writes all of the data to be recorded but not to be recorded yet on the optical recording medium and to be stored now in the temporary memory means, on the optical recording medium. Therefore, the MPU can prevent lost data even if a plenty of data are left in the write cache memory 9, and it reports the error to the host computer 1 after the write operation.

In this embodiment, before an abnormality occurs and before the possibility of abnormality occurrence becomes high, and if the temperature is greater than the range VI–VII, which is one range below the maximum range, in the exemplary table of FIG. 2, i.e., if the temperature is over VII° C., the MPU reports the error to the host computer 1, for example, it starts to write when the temperature recovers normally, and so on, and hence, it assures a normal data write operation after that.

In addition, in the first and second embodiments, even if the regular value is set at the value within the range VII–VIII, safety relating to a counter-measure against data loss is secured, but, in each embodiment, the value is set to the value which is one range below the maximum range, for higher safety.

Figure 6:
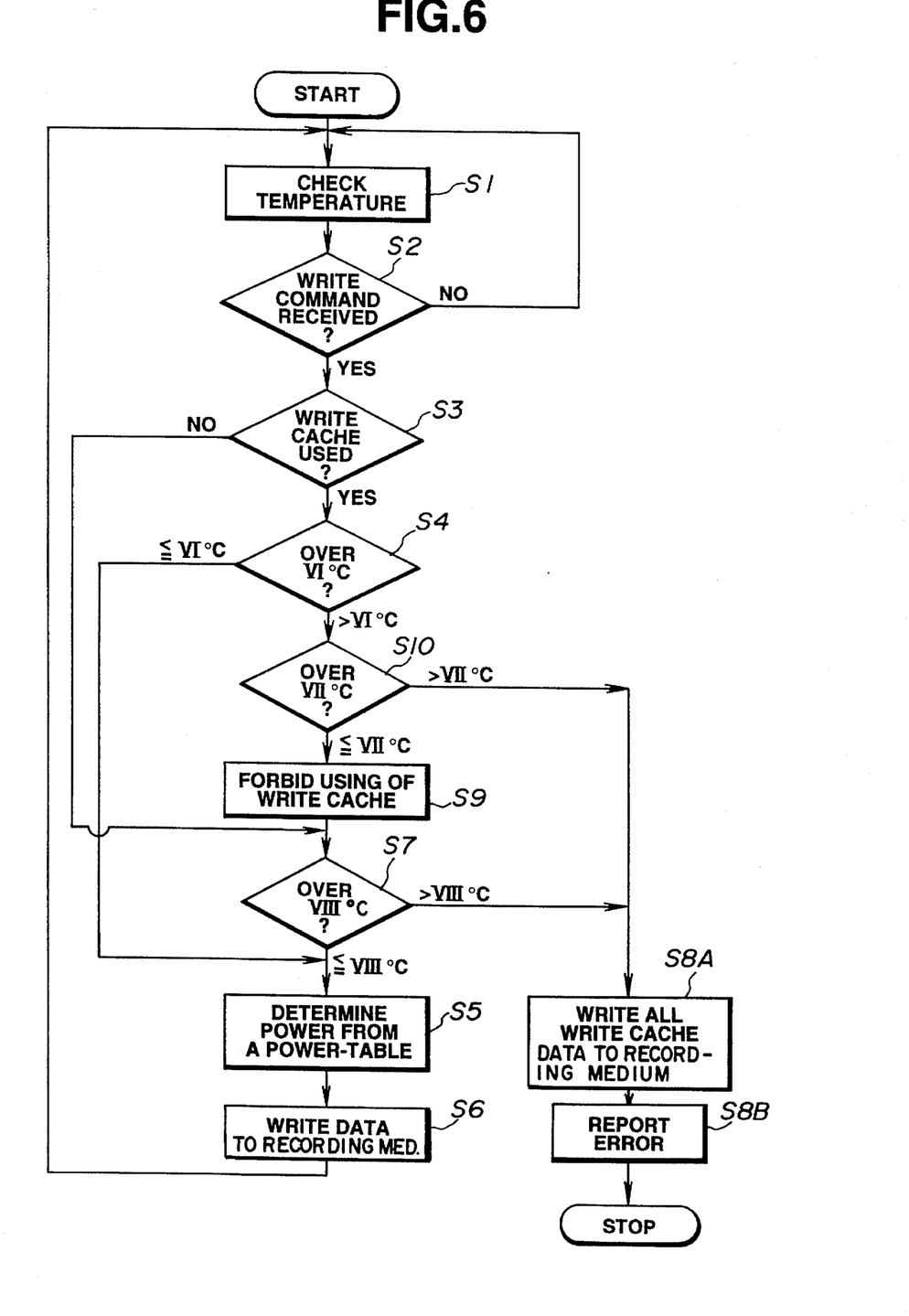
FIG. 6 is a flowchart relating to disk cache control in a write operation according to the third embodiment.

FIG. 6 is a flowchart relating to disk cache control in a write operation according to the third embodiment of the present invention.

The third embodiment is a combination of the first and second embodiments. In the first and second embodiments, when the temperature detected with the temperature sensor 14 becomes a value within the temperature range that is one range below the maximum range or over the range, the MPU writes all the data not to be written and to be stored in the write cache memory 9 to the optical recording medium 13, and after that it forbids using of the write cache memory 9 or reports the error to the host computer 1. On the other hand, this modified example is an apparatus having both of these operations.

Since an optical disk apparatus of this embodiment has a configuration and operation same as those of the first embodiment besides the following operations, drawings will be omitted and only different points will be described.

Operations of the optical disk apparatus according to this embodiment, as shown in the flowchart of FIG. 6, follow the flow that the step S10 in FIG. 5 is inserted before the steps S4 and S9 in the flowchart of FIG. 3. Therefore, if the temperature is greater than VI° C. at the step S4, and it is not greater than VII° C. at the step S10, the MPU forbids using of the write cache memory 9 at the step S9. Operations occurring after these operations are the same as those of the first embodiment.

On the other hand, if the temperature is greater than VI° C. at the step S4, and it is also greater than VII° C. at the step S10, the MPU reports the error through the step S8A at the step S8B. Operations after this are same as those of the second embodiment.

Since the other configuration, operation, and advantages are same as those in the first and second embodiments, descriptions will be omitted.

In addition, also in the embodiments after the second embodiment, the step S7' is changed to the step S7, and it is possible to decide with (VIII–α)° C. as the critical temperature that is confirmed at the step S7 and is reported as an abnormal temperature, further improving safety.

In the present invention, it is apparent that different embodiments in a wide range can be composed. The present invention is to be limited solely by the scope of the appended claims, thereby not being limited by its specifically embodied aspects.

What is claimed is:

1. An information recording apparatus for detecting a temperature and controlling a data write operation comprising:

a driving means for driving a light source radiating laser light onto an optical recording medium with a predetermined power for performing at least a data recording operation;

a detecting means for detecting a surface temperature of said optical recording medium;

a temporary memory means for temporarily storing data to be transferred from a computer host means and to be recorded on the optical recording medium; and a control means for controlling power of said laser light through said driving means so as to become a predetermined power, said control means for controlling at least one processing between processing for determining whether a temperature detected by said detecting means is greater than a regular value set at a value equal to or less than an abnormal temperature, and for writing all of said data to be recorded but not to be recorded yet on said optical recording medium and to be currently stored in said temporary memory means, on said optical recording medium after forbidding using of said temporary memory means if the detected temperature is over the regular value, or another processing for reporting an error to said computer host means after writing all of said data to be recorded but not to be recorded yet on said optical recording medium and to be currently stored in said temporary memory means, on said optical recording medium, if the detected temperature is greater than the regular value.

2. An information recording apparatus for detecting a temperature and controlling a data write operation as recited in claim 1, wherein said control means controls so that said detecting means performs said processing whenever a detected temperature is greater than said regular value set at a value near and less than a temperature regarded as an abnormal temperature.

3. An information recording apparatus for detecting a temperature and controlling a data write operation as recited in claim 1, wherein said control means transfers and once stores data to be written and sent from said upper control means in a temporary memory means, and writes said data to be recorded on said optical recording medium if a detected temperature is not greater than said regular value set at a value equal to or less than a temperature regarded as an abnormal temperature.

4. An information recording apparatus for detecting a temperature and controlling a data write operation as recited in claim 1, wherein said control means sets a temperature range detected with said detecting means in a plurality of ranges, and controls so as to perform said processing if a temperature detected with said detecting means is greater than said regular value included in a range that is one range below the highest range adjacent to a temperature regarded as an abnormal temperature.

5. An information recording apparatus for detecting a temperature and controlling a data write operation as recited in claim 1, wherein said control means sets a temperature range detected with said detecting means in a plurality of ranges, and controls so as to perform said processing if a temperature detected with said detecting means is greater than said regular value included in the highest range adjacent to a temperature regarded as an abnormal temperature.

6. An information recording apparatus for detecting a temperature and controlling a data write operation as recited in claim 1, wherein said control means sets a temperature range detected with said detecting means in a plurality of ranges, determines whether a temperature detected with said detecting means is greater than the first regular value included in a range that is one range below the highest range adjacent to a temperature regarded as an abnormal temperature, forbids using of said temporary memory means if this determination result is that it is over, after that, controls processing to write all of said data to be recorded but not to be recorded yet on said optical recording medium and to be stored currently in said temporary memory means, on said optical recording medium, on the other hand, determines whether a temperature detected with said detecting means is greater than the second regular value included in said highest range, writes all of said data to be recorded but not to be recorded yet on said optical recording medium and to be stored now in said temporary memory means, on said optical recording medium if this determination result is that it is over, and after that, reports an error to said computer host means.

7. An information recording apparatus for detecting a temperature and controlling a data write operation as recited in claim 4, wherein said control means sets a power level of said laser light at an adequate power corresponding to the temperature detected with said detecting means using a table where a plurality of adequate power levels of said laser light respectively corresponding to said plurality of ranges are set, just before this apparatus writes all of said data to be recorded but not to be recorded yet on said optical recording medium and to be stored now in said temporary memory means, on said optical recording medium.

8. An information recording apparatus for detecting a temperature and controlling a data write operation as recited in claim 4, wherein said control means forbids use of said temporary memory means if a temperature detected with said detecting means is greater than said regular value at the minimum value of a range which is one range lower than the highest range, and after that, performs processing to write all of said data to be recorded but not to be recorded yet on said optical recording medium and to be stored now in said temporary memory means, on said optical recording medium.

9. An information recording apparatus for detecting a temperature and controlling a data write operation as recited in claim 4, wherein said control means performs processing to write all of said data to be recorded but not to be recorded yet on said optical recording medium and to be stored now in said temporary memory means, on said optical recording medium if a temperature detected with said detecting means is greater than said regular value set at the maximum value of a range that is one range below the highest range, and after that, performs processing to report an error to said computer host means.

10. An information recording apparatus for detecting a temperature and controlling a data write operation as recited in claim 1, wherein said control means sets a temperature range detected with said detecting means in a plurality of ranges, determines whether a temperature detected with said detecting means is greater than the first regular value set at the minimum value of a range that is one range below the highest range adjacent to a temperature regarded as an abnormal temperature, after that, determines whether the temperature detected with said detecting means is greater than the second regular value set at the maximum value of a range that is one range less than the highest range, and performs processing to write all of said data to be recorded but not to be recorded yet on said optical recording medium and to be stored now in said temporary memory means, on said optical recording medium if said determination result is that it is not greater than the second regular value, and after that, performs processing to report an error to said computer host means, on the other hand, said control means controls so as to perform processing to report an error to said computer host means after writing all of the data to be recorded but not to be recorded yet on the optical recording medium and to be stored now in the temporary memory means, on the optical recording medium if said determination result is that it is greater than the second regular value.

11. An information recording apparatus for detecting a temperature and controlling a data write operation as recited in claim 6, wherein said control means forbids use of said temporary memory means if a temperature detected with said detecting means is greater than the first regular value set at the minimum value of the range that is one range less than the highest range adjacent to a temperature regarded as an abnormal temperature, and after that, performs processing to write all of the data to be recorded but not to be recorded yet on the optical recording medium and to be stored now in the temporary memory means, on the optical recording medium, on the other hand, said control means performs processing to write all of the data to be recorded but not to be recorded yet on the optical recording medium and to be stored now in the temporary memory means, on the optical recording medium if the temperature detected with said detecting means is greater than the second regular value set at the maximum value or the value, which is less than the maximum value by a predetermined value, of said highest range, and after that, reports an error to said computer host means.

12. An information recording apparatus for detecting a temperature and controlling a data write operation as recited in claim 1, wherein said control means determines whether said temporary memory means is used, and performs said processing if the determination result is that it is used.

13. An information recording apparatus for detecting a temperature and controlling a data write operation as recited in claim 1, wherein said control means determines whether said temporary memory means is used, determines whether a temperature detected with said detecting means is greater than the regular value set at a value equal to or less than an abnormal temperature if the determination result is that it is not used, performs processing to write all of the data to be recorded but not to be recorded yet on the optical recording medium and to be stored now in the temporary memory means, on the optical recording medium, and performs processing to report an error to said computer host means.

14. An information recording apparatus for detecting a temperature and controlling a data write operation as recited in claim 1, wherein said control means determines whether said temporary memory means is used, determines whether a temperature detected with said detecting means is greater than the regular value set at a value equal to or less than an abnormal temperature if the determination result is that it is not used, and permits using of said temporary memory means if it is not greater than the regular value.

15. A method for controlling a write operation in an information recording apparatus comprising the steps of:

detecting a surface temperature of an optical recording medium for performing at least a data recording operation;

confirming whether this apparatus has received from a computer host means a command to write data to be written to said optical recording medium;

determining whether a temporary memory means temporarily storing said data to be written is usable if the command has been received at said confirming step;

temperature-determining whether a temperature detected with said detecting means is greater than a regular value set at a value equal to or less than an abnormal temperature if the determination result is that it is usable;

writing all of the data to be recorded but not to be recorded yet on the optical recording medium and to be stored now in the temporary memory means, on the optical recording medium after forbidding using of said temporary memory means if it is over the regular value at said temperature-determining step.

16. A method for controlling a write operation in an information recording apparatus comprising the steps of:

detecting a surface temperature of an optical recording medium for performing at least a data recording operation;

confirming whether this apparatus has received from a computer host means a command to write data to be written to said optical recording medium;

determining whether a temporary memory means temporarily storing said data to be written is usable if the command has been received at said confirming step;

determining whether a temperature detected with said detecting means is greater than the regular value set at a value equal to or less than an abnormal temperature if the determination result is that it is usable;

writing all of the data to be recorded but not to be recorded yet on the optical recording medium and to be stored now in the temporary memory means, on the optical recording medium if it is greater than a regular value at said temperature-determining step; and reporting an error to said computer host means after completion of the write operation at said writing step.

17. A method for controlling a write operation in an information recording apparatus as recited in claim 15 or 16, wherein a determining means determines at said determining step whether or not a temporary memory means is currently used so as to determine whether said temporary memory means is in a usable state.

18. A method for controlling a write operation in an information recording apparatus as recited in claim 15 or 16, wherein a determining means confirms at said determining step at least a usage rate of said temporary memory means so as to determine whether said temporary memory means is in a usable state, and then, determines from the result of the usage rate whether said temporary memory means is currently used.

* * * * *